United States Patent
Estanislao et al.

(10) Patent No.: US 6,218,617 B1
(45) Date of Patent: Apr. 17, 2001

(54) SNAP-ON WALLPLATE AND HEAT SINK ASSEMBLY

(75) Inventors: Danilo F. Estanislao, Old Bridge, NJ (US); Joseph G. Justiniano, Centereach, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/419,725

(22) Filed: Oct. 15, 1999

(51) Int. Cl.[7] ....................................................... H02G 3/14
(52) U.S. Cl. .............................................. 174/66; 220/241
(58) Field of Search ............................... 174/66; 220/241, 220/3.8

(56) References Cited

U.S. PATENT DOCUMENTS

| | | | | |
|---|---|---|---|---|
| 3,735,020 | * | 5/1973 | Licata | 174/66 |
| 4,737,609 | * | 4/1988 | Yuhasz et al. | 200/330 |
| 5,189,259 | * | 2/1993 | Carson et al. | 174/66 |
| 5,712,450 | * | 1/1998 | Chan et al. | 174/66 |

\* cited by examiner

*Primary Examiner*—Dean A. Reichard
(74) *Attorney, Agent, or Firm*—Paul J. Sutton

(57) ABSTRACT

A snap-in assembly of a wallplate to a heat sink is achieved by placing notches in the ends of the heat-dissipating fins of the heat sink which receive in locking engagement the free ends of tabs placed along the inside of the peripheral wall, at the top and bottom ends, of the rear surface of the wallplate. The wallplate can be removed from the heat sink and reinstalled as desired.

9 Claims, 4 Drawing Sheets

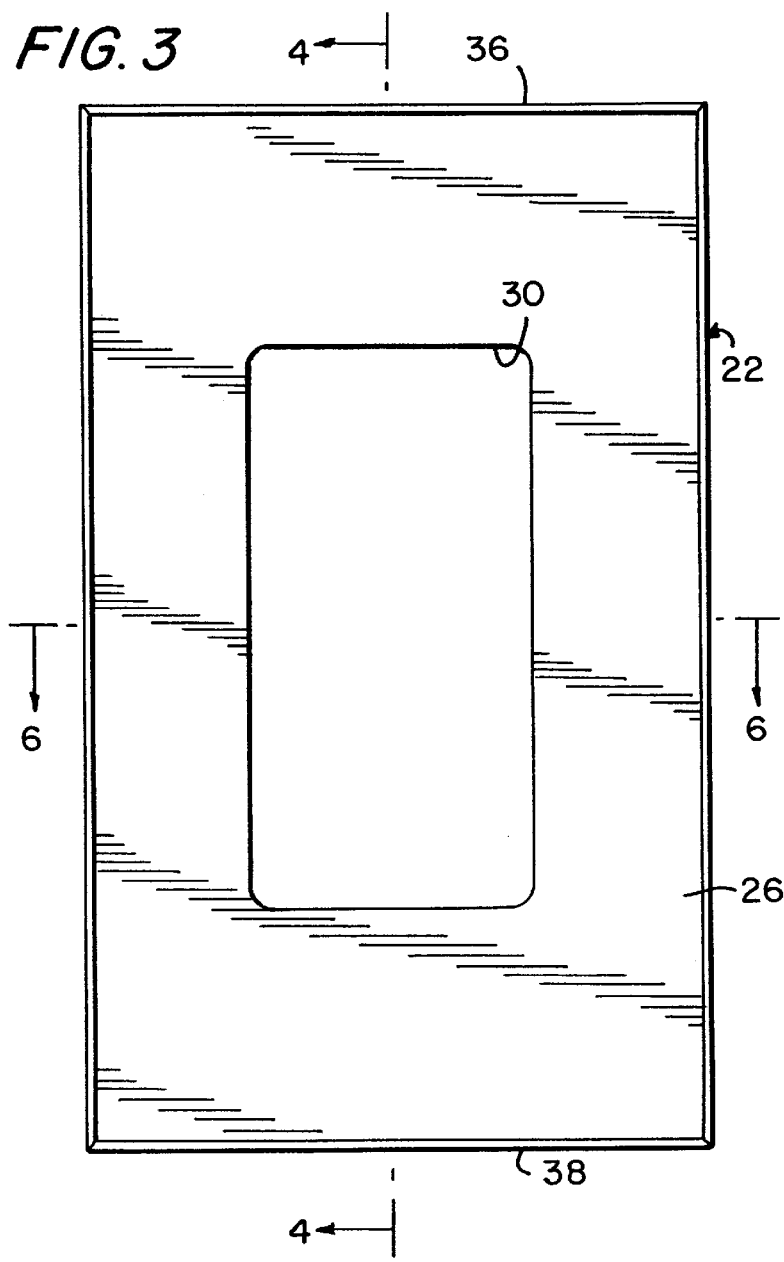
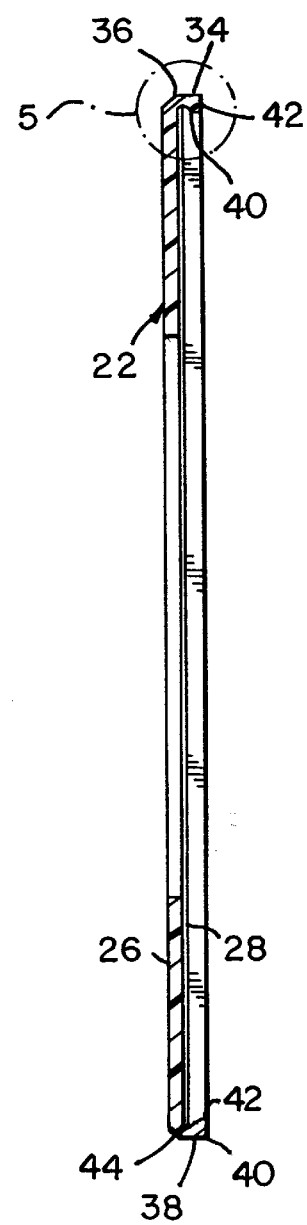
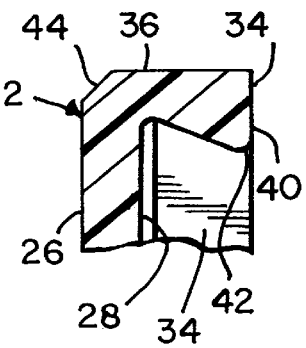

SNAP-ON WALLPLATE AND HEAT SINK ASSEMBLY

BACKGROUND OF THE INVENTION

Field of the Invention

The invention is directed to wiring devices and more particularly to wallplates and heat sinks for use with such devices.

SUMMARY OF THE INVENTION

An assembly of a wallplate with a heat sink provides a snap-on mounting of a wallplate on the heat-dissipating fins of a heat sink. The heat sink comprises a base upon which are formed a number of heat-dissipating fins, each having a notch at both of its two ends. A wallplate has a body which includes a wall extending along the entire periphery of the back surface of the body. A tab is formed on the inside surface of the wall along a top and bottom portion of the wall. The tabs each terminate in a free end which can lockingly engage the notches at the ends of the heat-dissipating fins to hold the wallplate and heat sink in assembly. The snap-on wallplate can be removed from the heat sink and reinstalled as desired. It is an object of this invention to provide a novel snap-on wallplate and heat sink assembly.

It is an object of this invention to provide a novel snap-on wallplate and heat sink assembly which does not require any additional fixtures to join the wallplate and heat sink.

It is another object of the invention to provide a novel snap-on wallplate and heat sink that uses notches and tabs for assembly of the wallplate to the heat sink.

Other objects and features of the invention will be pointed out in the following description and claims and illustrated in the accompanying drawings, which disclose, by way of example, the principles of the invention and the best mode which is presently contemplated for carrying them out.

BRIEF DESCRIPTION OF THE DRAWING

In the drawing in which similar elements are given similar reference characters:

FIG. 3 is a front elevational view of the wallplate of FIG. 1 showing the front face of the wallplate.

FIG. 4 is a slide elevational view, partly in section, taken along the line 4—4 in FIG. 3.

FIG. 5 is an enlarged, fragmentary portion, partly in section of a corner of the wallplate of FIG. 4 identified by the Circle 5 in FIG. 4.

FIG. 6 is a top plan view, partly in section, of the wallplate of FIG. 3 taken along the line 6—6 in FIG. 3.

DESCRIPTION OF THE PREFERRED EMBODIMENT

Figure 1:
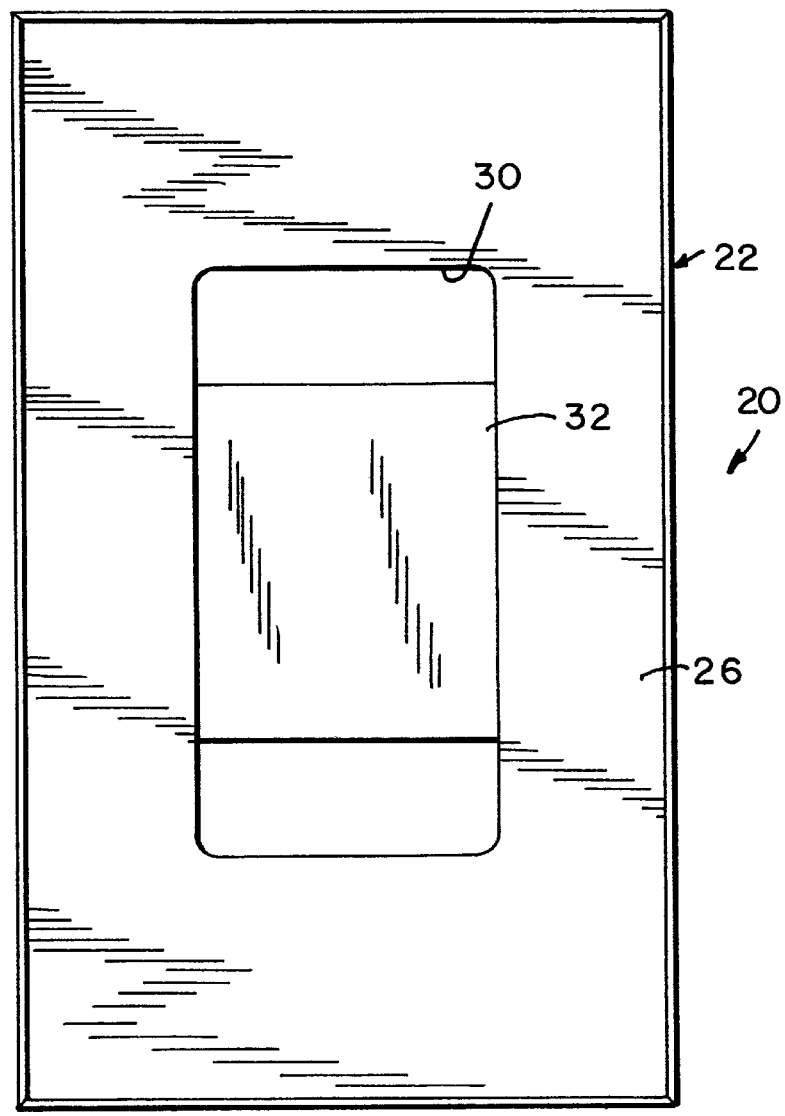
FIG. 1 is a front elevational view of a wallplate and best sink assembly according to the concepts of the invention and further showing a slide switch.

Turning to FIGS. 1 to 11 there is shown an assembly 20 of a wallplate 22 with a heat sink 24. The wallplate 22 has a front surface 26 and a rear surface 28. A cut-out 30 permits operating devices such as the slider switch 32 to extend through the wallplate 22 so that they can be manipulated by a user.

The wallplate 22 has a wall 34 which extends about the entire periphery of rear surface 28 as is best seen in FIG. 6. At the top and bottom edges, 36, 38, respectively, the wall 34 includes a further tab 40, whose free end 42 (FIGS. 4 and 5) is used to lock the wallplate 22 to the heat sink 24, as will be described below. The periphery of wallplate 22 at front surface 26 is tapered as at 44.

Turning now to FIGS. 7 to 10, the details of the heat sink 24 are shown. Heat sink 24 has a base member 50 having a central portion 52 having apertures 54 to fasten the heat sink 24 to an operating system such as a slide dimmer (not shown). The central portion 52 also supports an operating device such as the slide switch 32 shown in FIG. 2. Slots 56, 58 and 60 permit the slide switch 32 to move along central portion 52 of the heat sink 24. Flanking the central portion 52 are a number of heat-dissipating fins 62 (see FIGS. 7 and 8). Shown are four heat-dissipating 62 to each side of central portion 52. The number of heat-dissipating fins 62 can be increased or decreased as desired. The joint between the heat-dissipating fins 62 and the base member 50 can be scored so that any heat-dissipating fins 62 not required can be broken off and removed.

Figure 9:
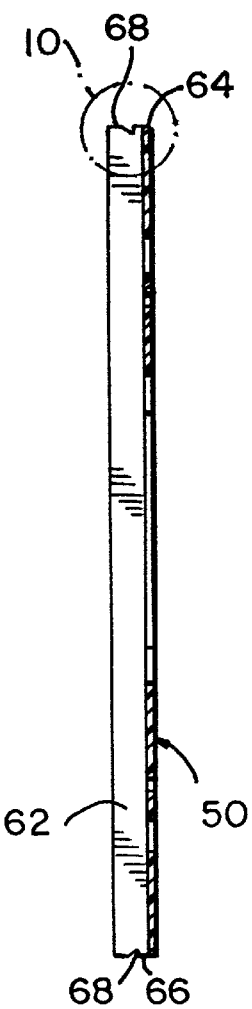
FIG. 9 is a side elevational view, partly in section, of the heat sink of FIG. 7 taken along the line 9—9 in FIG. 7.
Figure 8:
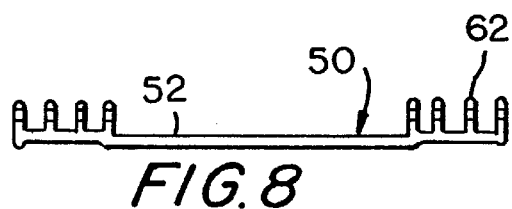
FIG. 8 is a top view of the heat sink of FIG. 7.
Figure 10:
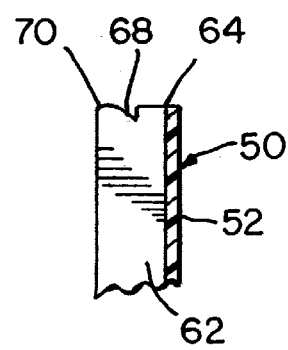
FIG. 10 is an enlarged, fragmentary portion, partly in section, of a corner of the heat sink of FIG. 9 identified by the circle 10 in FIG. 9.

At the top end 64 and the bottom end 66 of the heat-dissipating fins 62 is a notch 68 with a curved lead-in 70, as shown in FIGS. 9 and 10.

Figure 11:
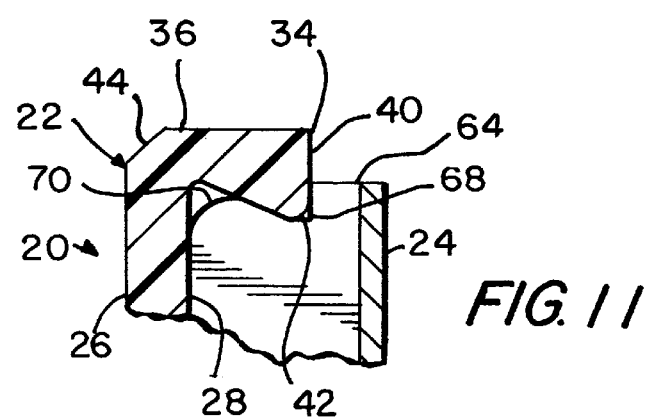
FIG. 11 is an enlarged, fragmentary portion, partly in section of the engagement between the wallplate of FIG. 3 and the heat sink of FIG. 7.
Figure 2:
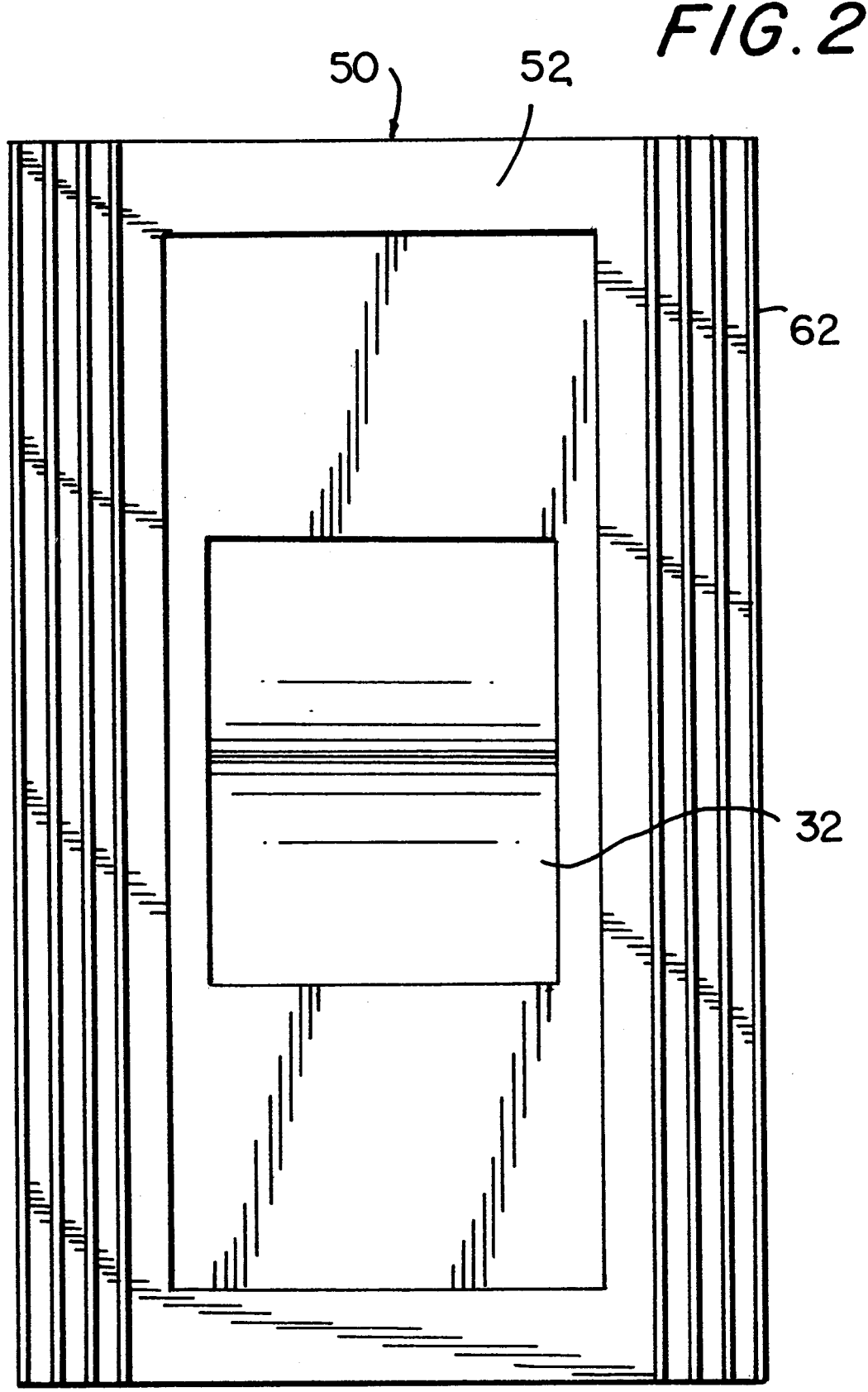
FIG. 2 is a front elevational view of the heat sink of FIG. 1 and showing a slide switch.
Figure 7:
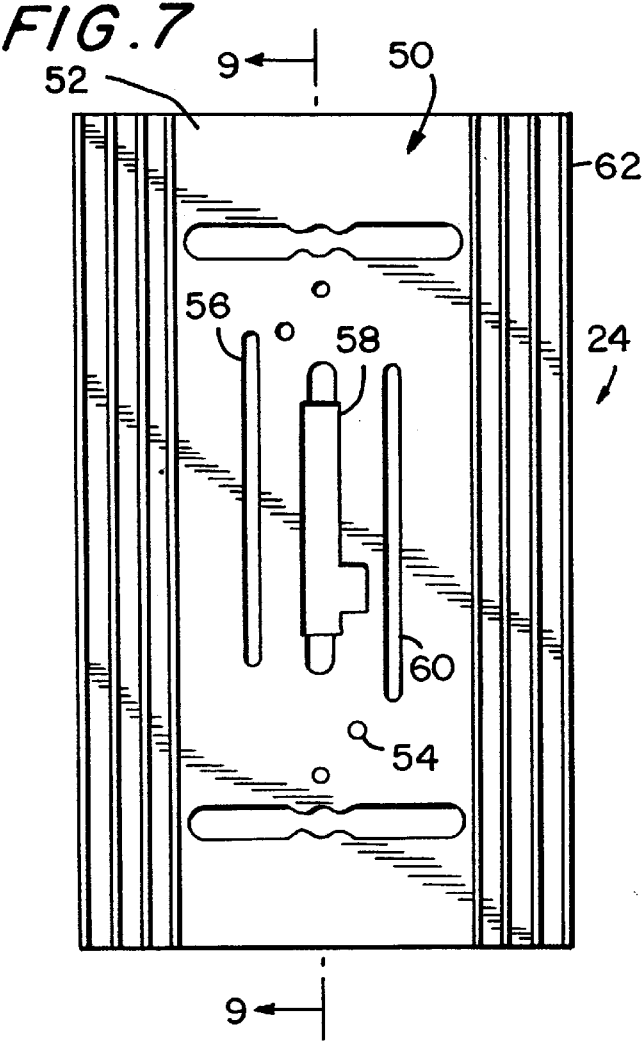
FIG. 7 is a front elevational view of the heat sink of FIG. 2.

Referring now to FIG. 11 the assembly of wallplate 22 to heat sink 24 is now set forth. The wallplate 22 is made of a plastic material which is resilient, such as a thermoset or thermoplastic material such as nylon, which can be stretched but recovers to its original shape when the stretching forces are removed. The heat sink 24 is made of metal, such as aluminum which is relatively rigid. It is assumed that the heat sink 24 is assembled to an operating system such as a slide dimmer (not shown) which in turn is mounted to a gang box (not shown) as is well known in the art. The heat sink 24 position is thus fixed. The top edge 36 of wallplate 22 is aligned with the top end 64 of the heat sink 24. Although not shown, the bottom edge 38 of wallplate 22 is also aligned with the bottom end 66 of heat sink 24. Force is then exerted on front surface 26 of wallplate 22. This causes free end 42 of tab 40 to move along curved lead-in 70 stretching the tab 40 and wall 34. As soon as the free end 42 of tab 40 enters notch 68, the tab 40 and wall 34 return to their initial sizes thus firmly holding the free end 42 of tab 40 of wallplate 22 in notch 68 of the heat sink 24. A similar action occurs at edge 38 of wallplate 22. To remove the wallplate 22 from the heat sink 24, the wallplate 22 is gripped at top edge 36 and bottom edge 38 and pulled in a direction away from the heat sink 24. This permits the free end 42 to trace the wall of notch 68 in the direction of curved lead-in 70 and stretch the tab 40 and wall 34 until the free end 42 is entirely out of notch 68. The wallplate 22 can be reinstalled to the heat sink 24 again as above described.

While there have been shown and described and pointed out the fundamental novel features of the invention as applied to the preferred embodiment, as is presently contemplated for carrying them out, it will be understood that various omissions and substitutions and changes of the form and details of the device illustrated and in its operation may be made by those skilled in the art, without departing from the spirit of the invention.

We claim:

1. A snap-on wallplate and heat sink assembly, comprising:
    a) a heat sink having a base member extending between a first end and a second end generally parallel with and spaced apart from said first end and two generally parallel, spaced apart side edges, said first end, said second end and said two side edges generally defining a rectangularly shaped base member, said base member having a top surface and a generally parallel bottom surface;
    b) said heat sink further having at least two heat-dissipating fins, each extending from and perpendicular with said top surface of said base member and each of said at least two heat-dissipating fins having a third end adjacent said base member first end and a fourth end adjacent said base member second end;
    c) each of said at least two heat-dissipating fins having a first coupling means at each of said third and fourth ends;
    d) a wallplate having a body member of a generally rectangular shape defined by a top edge, a generally parallel, spaced apart bottom edge and two parallel, generally spaced apart side edges, said body member having a first surface and a second, generally parallel second surface;
    e) a wall extending from and generally perpendicular to said second surface of said body member extending along said top edge, said bottom edge and said two side edges of said body member; and
    f) a second coupling means extending along said wall adjacent said top edge of said body member and third coupling means extending along said wall adjacent said bottom edge of said body member, said second coupling means adapted to lockingly engage said first coupling means at one of said third and fourth ends of said heat radiating fins and said third coupling means adapted to lockingly engage said first coupling means at the other of said third and fourth ends of said heat-dissipating fins to assemble said wallplate to said heat sink.

2. An assembly, as defined in claim 1, wherein said first coupling means at said third and fourth ends of said at least two heat-dissipating fins are notches.

3. An assembly, as defined in claim 1, wherein said second and third coupling means are tabs having free ends.

4. An assembly, as defined in claim 1, wherein said first coupling means at said third and fourth ends of said at least two heat-dissipating fins are notches and said second and third coupling means are tabs having free ends, said free end of said tab of said second coupling means lockingly engaging said notches at one of said third and fourth ends of said at least two heat-dissipating fins and said free end of said tab of said third coupling means lockingly engaging said notches of the other of said third and fourth ends of said at least two heat dissipating fins.

5. An assembly, as defined in claim 1, further comprising:
    a) a cut-out in said body member extending from said first surface to said second surface to permit an operating device to extend through said first surface to a position above it where it can be operated by a user.

6. An assembly, as defined in claim 1, further comprising:
    a) a cut-out in said base member extending from said top surface to said bottom surface to permit an operating device to extend there through.

7. An assembly, as defined in claim 6, wherein said at least two heat radiating fins is two, one to each side of said cut-out in said base member.

8. An assembly, as defined in claim 6, wherein said at least two heat-dissipating fins is eight and four of said eight heat-dissipating fins are placed to each side of said cut-out in said base member.

9. A snap-on wallplate and heat sink assembly, comprising:
    a) a heat sink having a base member extending between a first end and a second end generally parallel with and spaced apart from said first end, and two generally parallel, spaced apart side edges, said first end, said second end and said two side edges generally defining a rectangularly shaped base member, said base member having a top surface and a generally parallel bottom surface;
    b) said heat sink further having at least two heat-dissipating fins each extending from and perpendicular with said top surface of said base member and each having a third end adjacent said base member first end and a fourth end adjacent said base member second end;
    c) each of said at least two heat-dissipating fins having a notch at each of said third and fourth ends;
    d) a wallplate having a body member of a generally rectangular shape defined by a top edge, a generally parallel, spaced apart bottom edge and two parallel, generally spaced apart side edges, said body member having a first surface and a second, generally parallel second surface;
    e) a wall extending from and generally perpendicular to said second surface of said body member extending along said top edge, said bottom edge and said two side edges of said body member; and
    f) a first tab extending along said wall adjacent said top edge of said body member and a second tab extending along said wall adjacent said bottom edge of said body member, said first and second tabs having free ends to respectively engage said notches at said third and fourth ends of said at least two heat-dissipating fins to assemble said wallplate to said heat sink.

* * * * *